United States Patent [19]

Schwartz

[11] 4,162,090
[45] Jul. 24, 1979

[54] VEHICLE AXLE SUSPENSION ASSEMBLY

[75] Inventor: Robert B. Schwartz, Grosse Pointe Wds., Mich.

[73] Assignee: Fruehauf Corporation, Detroit, Mich.

[21] Appl. No.: 883,371

[22] Filed: Mar. 6, 1978

[51] Int. Cl.² ............................................. B60G 11/00
[52] U.S. Cl. .................................... 280/688; 267/52
[58] Field of Search .................. 280/688; 267/52, 53

[56] References Cited

U.S. PATENT DOCUMENTS

| | | | |
|---|---|---|---|
| 1,294,338 | 2/1919 | Hawkins | 267/52 |
| 1,499,654 | 7/1924 | Haselherst | 267/52 |
| 1,544,169 | 6/1925 | Orwig | 267/52 |
| 2,643,111 | 6/1953 | Burton | 267/52 |
| 3,437,333 | 4/1969 | Koch | 267/52 |
| 3,494,609 | 2/1970 | Harbers | 267/52 |
| 3,734,482 | 5/1973 | Duchemin | 267/52 |
| 3,929,347 | 12/1975 | Masser | 267/52 |

*Primary Examiner*—Philip Goodman
*Attorney, Agent, or Firm*—Harness, Dickey & Pierce

[57] ABSTRACT

An axle suspension assembly for vehicles has a trailing arm which is connected to the axle by means of a locator plate that is welded to the axle housing and heat shrunk on to the arm, the plate and the clamping pad that engages the opposite side of the arm having relieved faces that serve to minimize localized stress concentrations during high load conditions.

5 Claims, 4 Drawing Figures

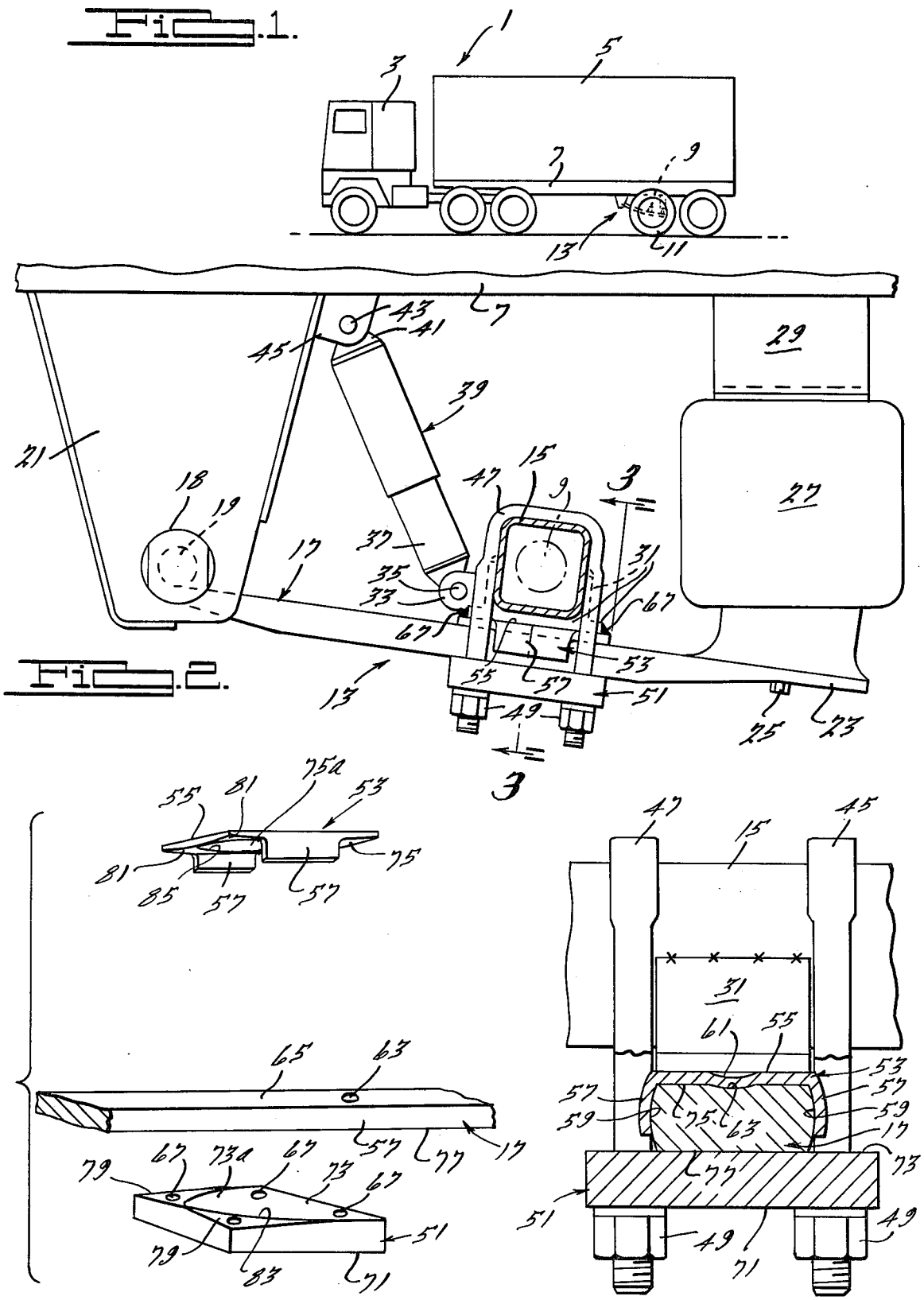

VEHICLE AXLE SUSPENSION ASSEMBLY

BRIEF SUMMARY OF THE INVENTION

It is the purpose of this invention to provide an improved connection between the axle and trailing arm of a vehicle axle suspension assembly which, among other benefits, minimizes the residual and localized stresses in the arm during assembly and operation. The invention accomplishes this purpose by means of a locator plate which is heat shrunk on to the trailing arm and it, not the arm, is welded to the axle housing thereby eliminating residual stresses and other disadvantages of direct axle housing to arm welding. The forward portions of the locator plate face adjacent the arm and of a U-bolt clamp pad face adjacent the arm are relieved with the result that sudden or large loads on the suspension assembly, which tend to move it relative to the vehicle chassis and are concentrated in the connection, are spread over larger areas than heretofore resulting in lower if not minimum stress concentrations in the joints between the trailing arm and the locator plate and pad.

DESCRIPTION OF THE DRAWINGS

FIG. 1 is a simplified side elevation of a truck utilizing an assembly embodying the invention;

FIG. 2 is an enlarged view, somewhat simplified, and with parts broken away, that is a side elevation of the assembly of FIG. 1;

FIG. 3 is an enlarged cross section along the line 3—3 of FIG. 2; and

FIG. 4 is an exploded view of the parts forming the improved connection of the invention.

DESCRIPTION OF THE INVENTION

A vehicle in the form of a truck 1 having a tractor 3 and a trailer 5 with a chassis frame 7 resiliently supporting an axle 9 that carries a pair of wheels 11 has been selected as a typical environment to illustrate the principles and structure of a preferred form of a vehicle axle suspension assembly 13 embodying the invention. It is understood that in actual practice there will be a suspension assembly 13 at each end of the axle 9 though only the one on the driver's side of the truck 1 is illustrated and described herein.

The axle 9 has a center section 15 of any suitable structure, e.g. circular instead of rectangular as illustrated, which is resiliently suspended on and beneath the chassis frame 7 by means of a straight cantilever steel trailing arm 17 which has an upwardly rebent forward end 18 that extends around and is pivoted on a bushing 19 which is secured in the bottom portion of a bracket 21 depending from and fixed to and below the frame 7. This connection enables the arm 17 to pivot about the horizontal axis of bushing 19 so that the arm can move up or down in a vertical direction to help absorb vertical loads imposed by the wheels 11 on the axle 9. The rear end 23 of arm 17 is on a lower vertical level than front end 18, so that the arm slants upwardly in a forward direction, and is tightly secured in a suitable manner at 25 to the bottom of a suitable inflatable air spring or cushion unit 27. The top of the air suspension unit 27 is tightly secured to a bracket 29 which in turn depends from and is fixed to and below the frame 7. The air spring 27 is selected to have a desired vertical working travel and will limit the vertical movement of the cantilever arm 17 and at the same time resiliently absorb and dampen vertical loads on the arm.

The bottom of the axle section 15 is fixed, as by welding, to a steel cradle 31 so that the cradle may be considered a part of the axle section. The cradle 31 is carried by arm 17 as will be described hereinafter. The cradle 31 has forwardly extending lugs 33 which carry a horizontal pivot 35 on which is mounted the bottom end 37 of an upwardly and forwardly extending hydraulic shock absorber assembly 39. The top end 41 of the shock absorber 39 is mounted on a horizontal pivot 43 that is carried by rearwardly extending lugs 45 affixed to a top rear portion of fixed bracket 21. The shock absorber 39 serves to dampen rapid vertical motion of the axle 9 and arm 17, to limit downward movement of the arm 17, and to transmit some axle loading due to braking into the frame 7.

Generally speaking, the foregoing structure was known prior to the present invention. U.S. Pat. Nos. 3,630,541 and 3,674,249 are relevant prior patents showing the general arrangement described along with the pair of U-bolts 47 to extend around axle 9 and be secured with nuts 49 and a steel pad 51 to clamp the axle to the trailing arm 17. The present invention is concerned with the interconnecting structure between the top, bottom, and sides of the trailing arm 17 and the pad 51 and axle 9.

According to the invention, a steel locator plate 53 is fitted over the top of the arm 17 in position to be located beneath the axle section 15 and cradle 31. This is a special connection formed by a shrink fit of the plate 53 on the arm. The locator plate 53 is channel-shaped (U-shaped) in cross section having a top 55 and side legs or flanges 57 and internal dimensions such that after assembly it has a substantially immovable grip on the arm 17. This assembly is accomplished by heating the plate 53, in an initial condition with its legs 57 straight (see FIG. 4) or somewhat divergent, to an elevated temperature (e.g. around 2500° F.) sufficient to make it plastic and malleable. The hot plate is placed on the arm and the legs 57 are hot formed around and against the sides 59 of the arm 17. Preferably, a portion 61 of the top 55 is indented while hot to form a protrusion or dished recess 63 in the top surface 65 of the arm 17. While the recess may be spherical, it is preferably ellipsoidal with its major axis being located along the longitudinal centerline of the surface 65. As seen best in FIG. 3, the sides 59 of the arm 17 are preferably convex and symmetrical about a vertical midplane and the flanges 57 are hot swaged over the sides 59 and across the horizontal midplane (i.e. overcenter or over a shoulder means on the sides 59). After cooling to ambient temperature, the plate 53 will have a high friction interference, shrink fit on arm 17 that is tight enough to make the two virtually inseparable. In addition, they are preferably mechanically united against longitudinal, lateral, or angular shifting by the ellipsoidal indentation 61 and recess 63 combination in conjunction with the overcenter flange structure just described.

The side flanges 57 of plate 53 are somewhat shorter than the top 55 to enable them to fit between the U-bolts 47. However, the top 55 is long enough to mate with the full length on the cradle 31 and be welded to it as indicated by the welds 67. The welding is done after the locator plate is assembled to the arm 17 but due to the nature of the joint between them stresses induced by the welding operation are not transferred into the arm 17 to create in it stress raisers or areas of residual stress or stress concentration due to attachment of the axle. Nevertheless, the axle section 15 is attached to the arm 17 in a rigid joint that provides stability and resistance to side sway and roll-over, proper axle alignment, proper brake force reaction and resistance, and the advantage of wedging type action if the ellipsoid indentation connection 61-63 is used. Also, since the arm 17 is not subjected to very high temperature, as it would be if the axle section were welded to it, its heat treated microstructure is not substantially altered and weakened.

In addition to the interconnections just described between the housing 15, cradle 31, plate 53, and arm 17, the aforementioned U-bolts 47 extend around these parts and pass through four holes 67 in the corners of clamp pad 51 so that proper torquing of nuts 49 against washers 69 engaging the flat bottom face 71 of the pad will unite them all in a very tight and rigid joint. Nevertheless, if the top face 73 of the clamp pad and the bottom face 75 of the locator plate bottom 55 were flat, as are the top and bottom faces 65 and 77 of the arm 17, there would be a tendency for the forward edges of the faces 73 and 75, where they engage the top and bottom of the arm, to be lines of stress concentration during certain intervals, such as braking, vertical shock loading, and non-uniform loading of the suspension system. During these intervals bending and twisting forces are concentrated at these edges and create a rather high stress concentration and rate of wear since the forces involved are applied to minimum areas.

In accordance with the invention, the stress concentrations just referred to are reduced by relieving the front corner portions 79 of the top face 73 of pad 51 and the front corner portions 81 of the bottom face 75 of the locator plate 53 so that these faces are not planar or flat. The relieved portions 79 and 81 are smooth and divergent forwardly and outwardly from the adjacent arm faces and shaped so that the remaining flat portions 73a and 75a are of a configuration that resembles a thumb print. It will be seen that the forward edges 83 and 85 of the thumb print areas are convex and somewhat parabolic in contour. Preferably, the outer edges of the relieved portions extend rearwardly from the front over about two-thirds of the lengths of the pad and plate and inwardly to about the centerlines of the pad and plate. Thus, the edges 83 and 85 of the pad 51 and plate 53, respectively, are very much longer than the mere width of the arm faces 77 and 65 which they contact and loading is spread over a much greater length than that of the straight lateral edges previously discussed. Further, if pivoting does occur about these edges due to conditions mentioned above, the flat, slanted relieved areas 79 or 81 begin to come in contact with the faces of the arm 17 to change line contact into areas of engagement thereby immediately and materially reducing the stress and overcoming the concentration of stress along a line. Thus, the invention tends to reduce load concentrations resulting from any cross sectional changes at the arm/axle connections as well as wear at the highly stressed portions.

It will now be seen that the invention provides an improved means for suspending an axle assembly on a vehicle chassis involving relatively simple changes in structure that produce significant stress advantages insofar as the highly loaded trailing arm is concerned while also providing other functions and advantages as mentioned above.

Modifications may be made in the specific structures disclosed without departing from the spirit and scope of the invention.

I claim:

1. In a vehicle axle suspension assembly comprising a trailing arm, a locator plate adapted to be welded to an axle section, said locator plate having an interference fit on said arm and being substantially rigid with said arm, said plate being U-shaped in cross section with the legs of the U engaged with and conforming to the sides of the arm, the sides of the arm have convex shoulder means facing away from said plate and the legs of said plate extending overcenter so as to be mechanically locked behind the shoulder means, whereby said arm is substantially free of welding stresses.

2. The invention as set forth in claim 1 wherein said interference fit is formed by heat shrinkage of the plate on to the arm.

3. The invention as set forth in claim 1 wherein said trailing arm has a forward end and a top face, said plate having a bottom face adjacent the top face of the arm, the corners of the forward portion of said bottom face being relieved and out of contact with said top face during normal loads on the assembly.

4. The invention as set forth in claim 3 wherein said relieved forward corner portions of said bottom face are shaped so that the remaining portion of said bottom face is substantially thumb print shaped.

5. The invention as set forth in claim 3 wherein said relieved forward corner portions of said bottom face are smooth and divergent away from said top face in forward and sideways directions.

* * * * *